United States Patent [19]

Hattori et al.

[11] Patent Number: 4,862,193

[45] Date of Patent: Aug. 29, 1989

[54] THERMAL RECORDING HEAD

[75] Inventors: Osamu Hattori, Chigasaki; Toshihiko Gotoh, Tokyo; Kohtarou Tanno, Kamakura, all of Japan

[73] Assignees: Hitachi Video Engineering Inc.; Hitachi Ltd., Tokyo, Japan

[21] Appl. No.: 253,561

[22] Filed: Oct. 5, 1988

[30] Foreign Application Priority Data

Oct. 7, 1987 [JP] Japan ................................ 62-251505

[51] Int. Cl.[4] ............................................ G01D 15/10

[52] U.S. Cl. ................................ 346/76 PH; 400/120; 219/216; 174/16.3

[58] Field of Search ............ 346/76 PH; 400/120 PH; 174/16.3; 219/216 PH

[56] References Cited

FOREIGN PATENT DOCUMENTS 0194592 11/1983 Japan ............................ 219/216 PH 0283564 12/1986 Japan .............................. 346/76 PH

*Primary Examiner*—C. L. Albritton

*Assistant Examiner*—Huan H. Tran

*Attorney, Agent, or Firm*—Antonelli, Terry & Wands

[57] ABSTRACT

A thermal recording head includes heating elements which are provided in one array on the front surface of a base plate, and a radiating plate which is fixed to the rear surface of the base plate. The radiating plate has a thickness l satisfying $l \geqq 2d$ where d denotes the diameters of mounting holes formed in the radiating plate, some of the mounting holes are disposed at predetermined intervals at positions substantially corresponding to the heating element array, and the spacing $l_2$ between the base plate and the bottom of each of the mounting holes satisfies $l_2 \geqq d$.

6 Claims, 6 Drawing Sheets

THERMAL RECORDING HEAD

BACKGROUND OF THE INVENTION

The present invention relates to thermal recording heads, and more particularly to a thermal recording head which is well suited to a video printer for obtaining the hard copy of a picture.

Heretofore, as a method of forming a full-colored picture print, there has been employed a thermal transfer method wherein a sheet of inks in the three colors of yellow, magenta and cyan (for example, a sublimable dye ink sheet) is used, and the inks are transferred onto printing paper by energizing a thermal recording head in which heating elements are disposed in one array. For the purpose of obtaining a picture print of high picture quality, in case of the A4-size by way of example, the number of the heating elements of the thermal recording head is usually selected at 1000 dots or above, and an electric power of about 100W is consumed on the average. As shown in FIG. 3, the prior-art thermal recording head is so constructed that the heating elements 25 are formed on an alumina-ceramic base plate 24, and that a radiating plate 26 is fixed to the rear surface of the base plate 24 by adhesives. The radiating plate 26 serves to prevent heat generated by the heating elements 25, from being accumulated in the base plate 24. In the prior-art head of this type, however, the thickness of the radiating plate 26 is only about 5 times that (about 1 mm) of the base plate 24, so the effect of heat radiation is insufficient for the heat generation of the large number of dots as in the case of the picture print. Even when radiating fins are further mounted in contact with the rear surface of the radiating plate 26 or when a forced cooling fan is provided, rise in the temperature of the base plate during the printing operation cannot be satisfactorily suppressed yet. This has led to the problem that a density varies greatly in the print, to degrade the picture quality of the print. Meanwhile, the rear surface of the radiating plate 26 is formed with various mounting holes for the purposes of, e. g., positioning the head and printer mechanisms and imparting the contact pressure of the head. The positional accuracy of the heating element array of the head and the stability as well as the uniformity of the contact pressure between the heating elements and recording paper exert important influences on the picture quality of the print. For this reason, the mounting holes for positioning the head and the holes for mounting springs for compressing the heating elements to the recording paper are usually formed at positions which substantially correspond to the heating element array 27 indicated by a broken line in FIG. 4. By way of example, in FIG. 4, symbols 28*a* and 28*b* denote the mounting holes for positioning the head, numerals 29 the holes for mounting the compression springs, numeral 30 a hole for mounting a temperature detecting thermistor 31, and numerals 32 holes for mounting the radiating fins, and among them, the holes 28*a* and 29 are formed at the positions corresponding to the heating element array 27. In this regard, since the thickness of the radiating plate 26 is not sufficiently great relative to the diameters of the mounting holes in the prior-art head, the mounting holes are inevitably formed into through holes in order to attain screwing strengths. Consequently, parts corresponding to the mounting holes under the base plate become air (heat insulating) parts, so that the heat generated by the heating elements over the mounting holes is difficult to radiate. This has led to the problem that the temperatures of some of the heating elements heighten to incur a density irregularity on the printed picture. When the positions of the mounting holes are widely shifted from the position of the heating element array, the density irregularity ascribable to the radiating property is avoided. However, it becomes difficult to attain the positional accuracy of the heating elements or the accuracy of the contact pressure of the heating elements relative to a platen roller, to bring about the different problem that roughness is prone to appear on the printed picture.

In addition, a method in which printing conditions are controlled on the basis of the detection of the temperature of the head is employed for attaining a high printed picture quality. The prior-art head, however, has had the problem that, since the radiating plate is thin, the temperature distribution thereof is apt to become nonuniform, so the detection of the average temperature of the whole head is difficult.

As described above, the prior-art thermal recording head has involved the problem that the heat radiation for the heat generation by the large number of dots is not satisfactorily considered for the radiating plate, so the density varies greatly in the print, and the problem that, since the radiating plate is formed with the through holes, the radiating property thereof worsens partly in the direction of the heating element array, so the density irregularity appears.

SUMMARY OF THE INVENTION

An object of the present invention is to provide a thermal recording head according to which a density in a print varies little even in case of heat generation by a large number of dots, and besides, a high picture quality with a density irregularity lessened over the whole heating element array is attained.

The object is accomplished in such a way that a radiating plate having a thickness and a heat capacity with which the amount of heat generated by heating elements can be effectively radiated, and a thermal time constant becomes sufficiently great, is attached to the rear surface of a base plate opposite to the front surface thereof for mounting the heating elements, and that mounting holes in the radiating plate are formed as non-through holes at positions which substantially correspond to the array of the heating elements, and with depths with which no density irregularity appears. The above construction is further expressed by numerical values as follows: Letting d denote the largest one of the diameters of the mounting holes, the thickness $l$ of the radiating plate is set at, at least, $2d$, desirably $4d$ or above, and the distance $l_2$ between the base plate and the bottom of each of the mounting holes in the radiating plate is set at, at least, d, desirably $2d$ or above.

By way of example, when the diameters of the mounting holes to be formed in the radiating plate are set at d and the thickness of the radiating plate is set at $4d$–$5d$, the thickness and volume of the radiating plate become several times greater than in the prior-art head. Thus, the effect of heat radiation increases, and the heat capacity of the radiating plate becomes several times larger than in the prior-art head, to enlarge the thermal time constant thereof (proportional to the heat capacity), so that a temperature rise in a printing operation can be moderated, and a density variation can be greatly mitigated. In addition, even when the mounting holes are formed at the positions corresponding to the heating element array, the distance between the bottom of each of the mounting holes and the base plate and the depth of each of the mounting holes can be respectively set at sufficient values of, for example, $2d$–$3d$ and $2d$. Thus, the worsening of a radiating property attributed to the presence of the mounting holes can be reduced down to a negligible level, and the appearance of a density irregularity can be prevented. Accordingly, the head mounting holes or spring mounting holes can be formed at the positions substantially corresponding to the heating element array, so that a high positional accuracy is readily attained, the conditions of the contacts between the head and sheets of paper are optimalized, and a high printed picture quality can be attained.

DESCRIPTION OF THE PREFERRED EMBODIMENTS

An embodiment of the present invention will now be described with reference to FIGS. 1 and 2.

Figure 1:
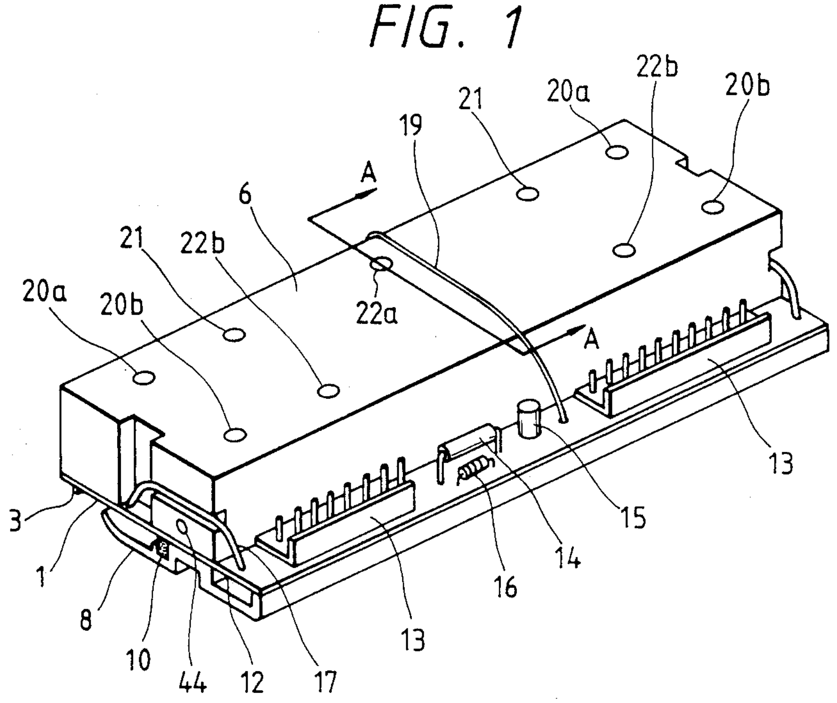
FIG. 1 is a perspective view showing an embodiment of a thermal recording head according to the present invention.
Figure 2:
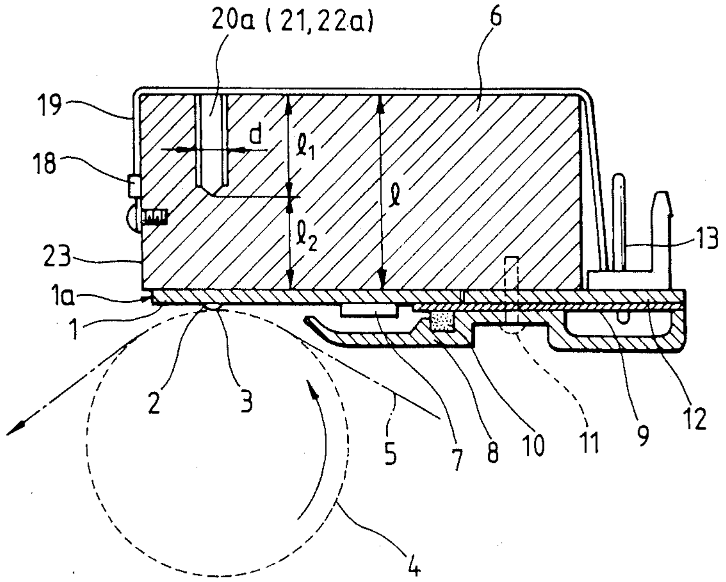
FIG. 2 is a view showing a section A—A in FIG. 1.

FIG. 1 is a perspective view, while FIG. 2 is a sectional view taken along a plane A—A in FIG. 1.

Referring to FIGS. 1 and 2, numeral 1 designates a base plate which is made of alumina ceramics. Numeral 2 designates a partial glaze layer which is a glass layer formed in the shape of a semicylinder having a width of about 1 mm and a height of about 50 μm, and on which heating elements 3 are formed into one array. The heating elements 3 are held in contact with a platen roller 4 made of rubber as indicated by a broken line, under a predetermined pressure, and an ink sheet and printing paper are conveyed along a path indicated at numeral 5 as the platen roller 4 rotates, whereby print recording is performed. Numeral 6 indicates a metallic radiating plate which is fixed to the rear surface of the base plate 1 opposite to the heating element-mounting surface thereof, numeral 7 an IC for driving the heating elements as is installed on the base plate 1, numeral 8 a head cover, numeral 9 a flexible base plate, numeral 10 a depressing rubber member which serves to hold wiring ends on the base plate 1 and wiring ends on the flexible base plate 9 in pressed contact, numeral 11 a screw for fixing the head cover 8, numeral 12 a connector mounting base plate, and numerals 13 connectors. By the way, a temperature fuse 14, a capacitor 15, a film resistor 16, etc. are connected to the connector mounting base plate 12 as may be needed, in addition to the connectors 13. Shown at numeral 17 is a common input lead which serves to feed the heating elements 3 with electric power, and which is connected to a common electrode disposed on the rear surface of the base plate 1. The connection position of the common input lead 17 is set at that end part of the base plate 1 which is sufficiently spaced from the position of the heating element array. Numeral 18 denotes a temperature detecting thermistor which is mounted on the side surface of the radiating plate 6, and which has a lead 19. The rear surface of the radiating plate 6 is formed with mounting holes 20*a* and 20*b* for positioning and fixing the head to the mechanism system of a printer, holes 21 for mounting springs for applying pressures, and holes 22*a* and 22*b* for mounting radiating fins. Among these mounting holes, those 20*a*, 21 and 22*a* have their central positions set at or near the position of the heating element array 3 on the base plate 1.

The present invention is characterized in that the thickness $l$ of the radiating plate 6 is rendered very great. More specifically, as illustrated in FIG. 2, when d is let denote the diameter of one of the largest bore in the mounting holes 20*a*, 21 and 22*a* formed at the positions corresponding to the heating element array, the aforementioned thickness $l$ is set at, at least, $l=>2d$, desirably $l$–$4d$. Thus, even in a case where the depth $l_1$ of each of the mounting holes is set at a value (of at least d, desirably $2d$ or above) with which a satisfactory screwing strength is attained, the spacing $l_2$ between the bottom 23 of the mounting hole and the base plate 1 can be set at, at least, d, desirably $2d$ or above. Subject to the conditions that the mounting hole is non-through and that the spacing $l_2$ between the bottom 23 and the base plate 1 is sufficiently long, the worsening of a radiating property attributed to the presence of the mounting hole can be reduced to a negligible level even when the mounting hole is provided at the position substantially corresponding to the position of the heating element array 3. Moreover, owing to increases in the volume and mass of the radiating plate, the radiating property improves and a thermal time constant enlarges, to effectively radiate heat generated by the heating elements 3 and to moderate the temperature rise of the base plate 1, so that a density variation in a print can be mitigated. As an example of concrete numerical values, the diameter of each mounting hole was set at $d=4$ mm, the thickness of the radiating plate at $l=19$ mm, the depth at $l_1=9$ mm, and the spacing at $l_2=10$ mm. Effects based on this example will be described with reference to FIG. 5 and FIGS. 6*a* and 6*b*.

Figure 3:
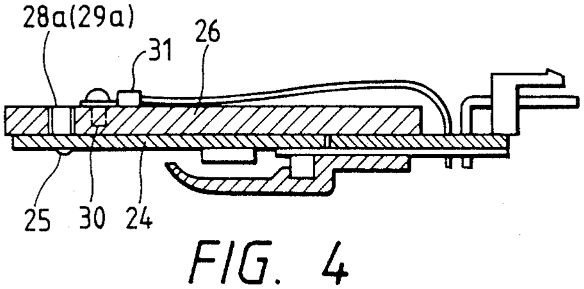
FIG. 3 PRIOR ART
FIG. 3 is a sectional view showing a part of the structure of a prior-art example.
Figure 4:
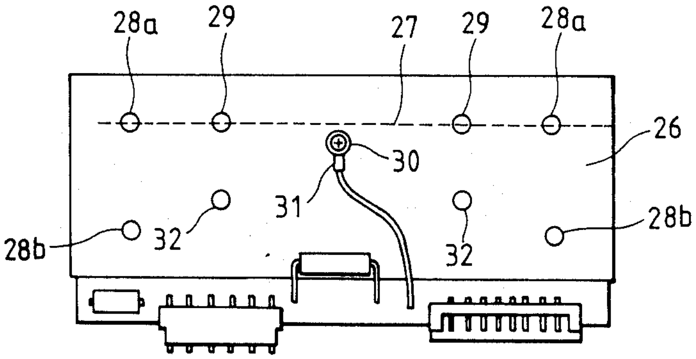
FIG. 4 PRIOR ART
FIG. 4 is a plan view of the prior-art example.
Figure 5:
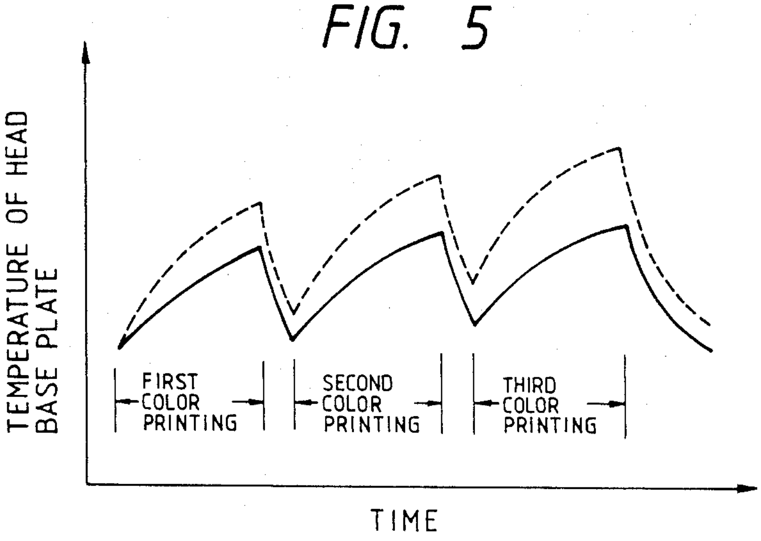
FIG. 5 and FIGS. 6*a* and 6*b* are explanatory diagrams for comparing the characteristics of the present invention and the prior-art example.

FIG. 5 illustrates the variation of the temperature of the head base plate in a picture printing operation by the thermal recording head according to the present invention, in comparison with the variation in the case of the prior-art head. In the figure, a broken line indicates the case of the prior-art head, while a solid line indicates the case of the present invention. Since the thickness and mass of the radiating plate are made about 3 times as great as those of the prior-art head, both the temperature rise during the printing of one color and the temperature rise during the printing of three colors (the printing of one picture) become much less than in the case of the prior-art head, and the difference of densities at the start of the printing and at the end thereof can be sharply reduced. Incidentally, as a method wherein the variation of the printed density attributed to the temperature rise of the base plate during the printing operation is compensated by a head driving mode, there is a so-called "gamma characteristics correction" in which a conduction time for the heating elements of the head is changed depending upon the temperature of the base plate. In this regard, since the head of the present invention exhibits the low degree of rise in the temperature of the base plate, the switching of gamma characteristics can be restrained to the minimum number of times, and a high printed picture quality of good color (halftone) reproducibility can be attained. In addition, for the purpose of detecting the temperature of the base plate, the temperature detecting thermistor is mounted on the radiating plate by screwing. In this regard, in the prior-art head, the thermistor 31 has been disposed substantially centrally of the rear surface of the radiating plate 26 as shown in FIGS. 3 and 4.

In the case of the prior-art head, however, the temperature distribution of the whole radiating plate is apt to become nonuniform because the radiating plate 26 is thin, so that the temperature of the place of installation of the thermistor does not always serve as the typical value of the temperature of the head base plate. In order to solve this drawback, there is required, for example, a measure in which thermistors are disposed in several places so as to take the average of the detected temperatures thereof. In contrast, in the head of the present invention, the radiating plate 6 is thickened, so that the thermistor 18 can be disposed at the position of the side surface of the radiating plate 6 somewhat distant from the base plate 1 as shown in FIG. 2 by way of example. Consequently, even when only one thermistor is disposed substantially centrally in the direction of the heating element array, the mean temperature of the whole head can be detected, and a temperature control of high accuracy is realized.

Figure 6A:
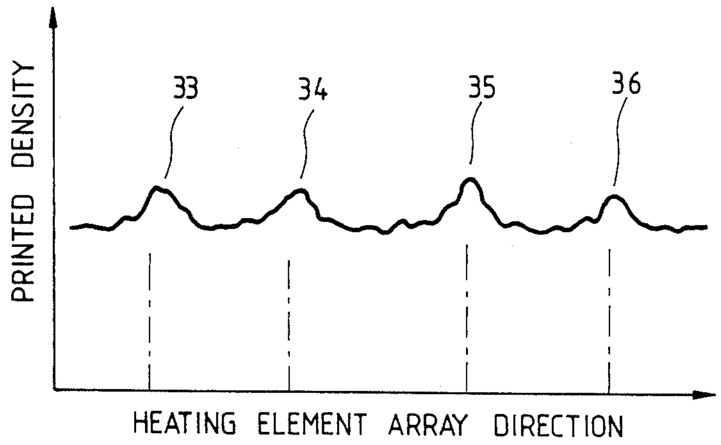
Figure 6B:
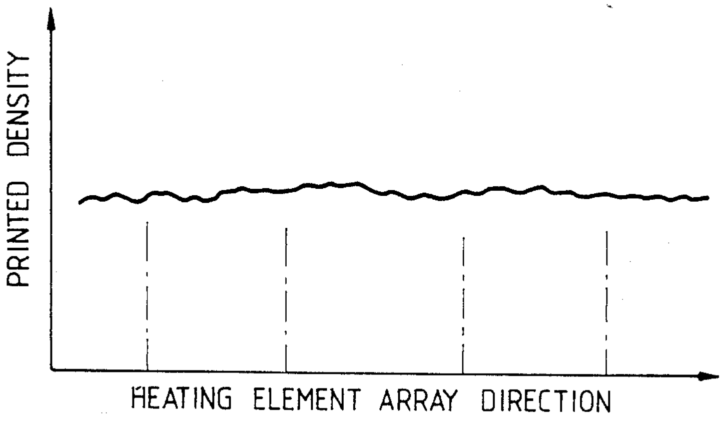

FIGS. 6a and 6b illustrate the effect of betterment of a density irregularity owing to the thermal recording head according to the present invention, as compared with the prior-art head. FIG. 6a shows the printed density characteristics in the direction of the heating element array, of the prior-art head wherein the radiating plate 26 is formed with the mounting holes (through holes) at the positions corresponding to the heating element array 27 as indicated by dot-and-dash lines, while FIG. 6b shows the printed density characteristics of the head of the present invention. In the case of the prior-art head, peaks 33–36 appear in the printed density at heating element parts (four places) corresponding to the positions of the radiating plate formed with the mounting holes. The peaks become higher as the diameters of the holes formed in the radiating plate are larger and as the positions of the mounting holes are closer to the position of the heating element array. When the through holes are provided near the heating element array, the radiating property worsens even if they are not in perfect coincidence with the heating element array. Especially in case of an all over print, the density irregularity is definitely sensed. It has been experimentally revealed that, for the purpose of suppressing the density irregularity ascribable to the mounting holes to be below a discriminating threshold level (a minute density irregularity ascribable to the dispersion of the resistances of the heating elements), the spacing $l_2$ and the largest diameter d need to be set at $l_2 \geqq d$, desirably $l_2 \geqq 2d$. In the printed density characteristics of the head of the present invention in which $l_2 = 10$ mm and $d = 4$ mm are set, no peaks appear at the positions corresponding to the mounting holes as seen from FIG. 6b, and only the irregularity ascribable to the dispersion of the resistances of the heating elements develops, so that the density irregularity ascribable to the mounting holes is completely below the discriminating threshold level. As understood from FIGS. 5 thru 6b, in the case of the head of the present invention, the density variation in the print is little, and the density irregularity is slight, so that a picture print of high picture quality is obtained, and a great effect is demonstrated particularly in printing a large picture with a large number of heating elements.

Figure 7:
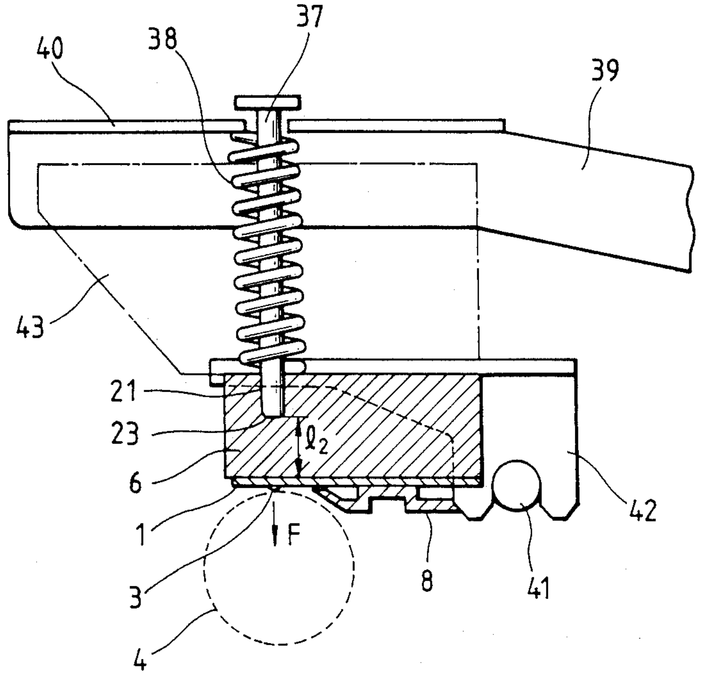
FIG. 7 is a diagram showing an example of installation of a thermal head according to the present invention.

FIG. 7 shows an example of a mechanism for imparting the contact pressure between the heating elements and the platen roller of the head of the present invention, and the same symbols are assigned to the same portions as in FIGS. 1 and 2.

Referring to FIG. 7, numeral 3 designates the heating elements, numeral 21 a spring mounting hole of diameter d with which a radiating plate 6 is formed at a position substantially corresponding to the heating element array 3, numeral 37 a guide pin of diameter d which snugly fits in the mounting hole 21, numeral 38 a compressing spring, numeral 39 a head arm, numeral 40 a compressing plate, numeral 41 a supporting pin, and numeral 42 a head positioning arm. According to the present invention, since the thickness of the radiating plate 6 is great, the non-through spring mounting hole 21 for which the spacing 12 between the bottom 23 of this mounting hole and a base plate 1 is set at $l_2 \geqq d$, desirably $l_2 \geqq 2d$ can be provided at the position substantially corresponding to the heating element array 3. Accordingly, the spring force F of the compressing spring 38 acts on the heating elements located directly under this spring, so that a stable and uniform contact pressure is attained.

Similarly, mounting holes (20a in FIG. 1) for positioning and fixing the head to printer mechanisms can be formed at positions corresponding to the heating element array. Owing to these facts, roughness on a printed picture to arise due to the positional deviation of the heating elements of the head or an insufficient contact pressure can be avoided.

Figure 8:
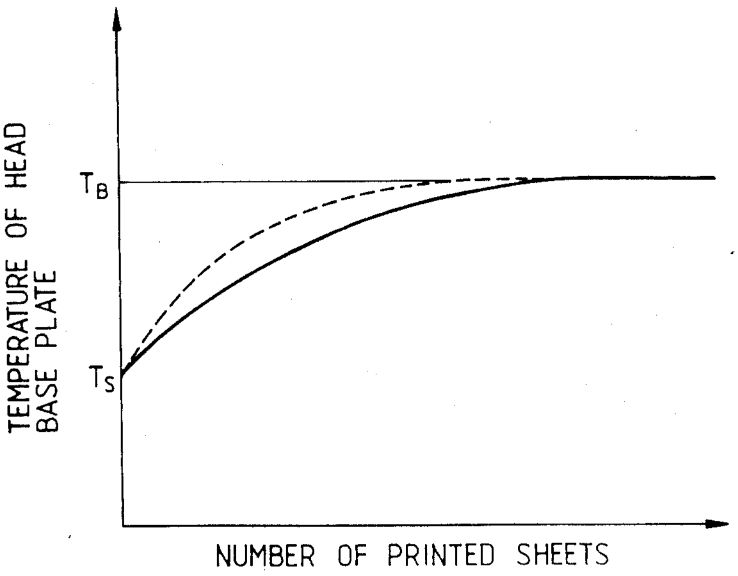
FIG. 8 is a diagram illustrating the effect of the head of the present invention.

Besides, numeral 43 indicates a radiating fin which enhances the effect of heat radiation more in order that the temperature rise of the head in the operation of continuously printing a large number of copies may be suppressed to the minimum. In the continuous printing operation, since the thermal time constant of the radiating plate is great in the head of the present invention, the temperature rise (in the case of the present invention as indicated by a solid line) proceeding until a balancing temperature ($T_B$) determined by the radiating fin is reached becomes gentler than in the case of the prior-art head (indicated by a broken line) as illustrated in FIG. 8. Accordingly, the density difference of each copy in the continuous printing operation can be reduced. Symbol $T_S$ denotes a printing start temperature.

Figure 9:
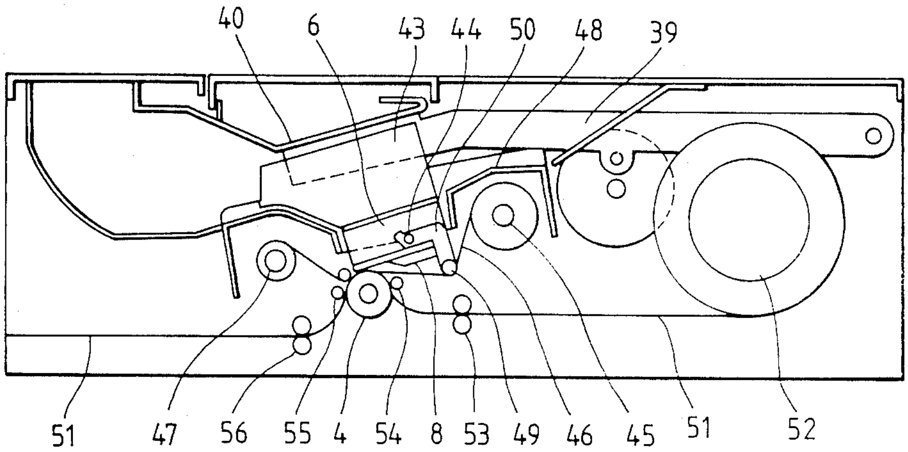
FIG. 9 is a view showing an example of installation of the head of the present invention.

Since the radiating plate 6 of the thermal recording head according to the present invention is thick, a mounting hole can also be formed in the side surface of the radiating plate as shown at numeral 44 in FIG. 1 by way of example, and it can be utilized for various purposes. FIG. 9 shows an example therefor in which a mounting hole for a winding roller for an ink sheet is provided, together with the whole construction of a printer.

The mounting hole is also formed in the opposite side wall to the side wall shown at numeral 44 in FIG. 1.

Referring to FIG. 9, numeral 45 designates an ink sheet feeding shaft round which the ink sheet 46 is rolled, and numeral 47 an ink sheet taking-up shaft. These constituents are received in a cover indicated at numeral 48, and are put into the shape of a cassette. The ink sheet 46 is conveyed from the ink sheet feeding shaft 45 to the ink sheet taking-up shaft 47 with the turning of a platen roller 4, and the winding roller 49 is provided in the course of the conveyance. The winding roller 49 is mounted on the distal end of a roller mounting end 50 the base end of which is fixed in the mounting holes 44 formed in the both side surface of the radiating plate 6. On the other hand, a recording sheet 51 is rolled round a recording sheet reel 52, and it is conveyed according to sheet guide rollers 53, 54, 55 and 56 with the turning of the platen roller 4, thereby to be printed. Since the head according to the present invention is furnished with the winding roller 49 by utilizing the mounting hole 44 of the roller mounting arm 50 formed in the side surface of the radiating plate 6, it has the advantage that the whole conveyance system for the ink sheet and the recording sheet can be reduced in size and thickness while the touch of the ink sheet 46 with the head cover 8 is avoided. More specifically, the ink sheet conveyance system (cassette) can be compacted on the upper side with respect to the platen roller 4, and a conveyance path for the recording sheet can consequently be made rectilinear, so that the whole printer can be miniaturized and thinned. Moreover, since a conveyance path for the ink sheet does not change depending upon the remaining amount of the ink sheet, the ink sheet and the head can be always held in contact at a constant admission angle, and a stable printing operation can be performed.

Incidentally, the mounting hole formed in the side surface of the radiating plate does not have its purpose restricted to the ink sheet winding roller described above, but it can be extensively utilized for mounting various rollers in the conveyance system of the ink sheet or the recording sheet.

Figure 10:
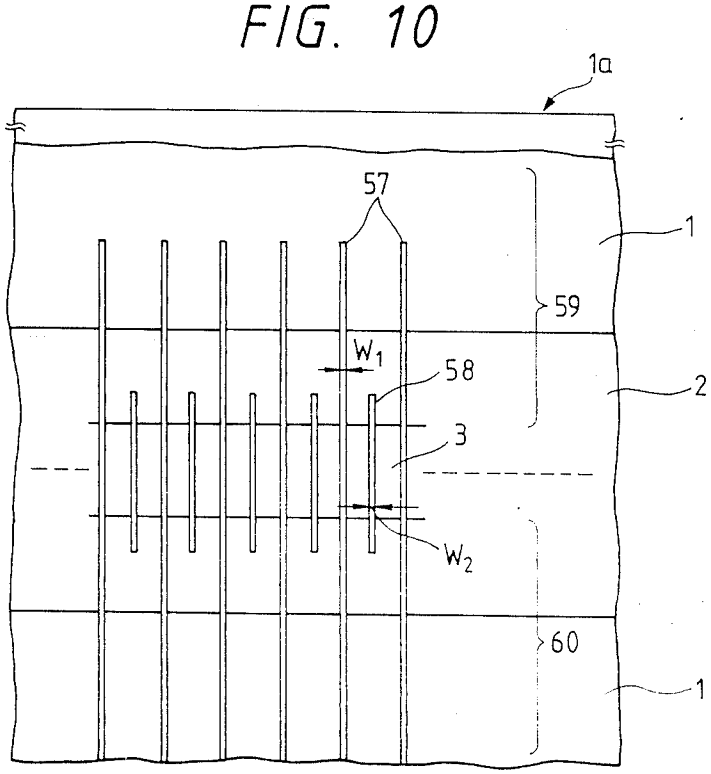
FIG. 10 is a view showing the detailed structure of a heating unit in the head of the present invention.

FIG. 10 is a plan view showing the details of a heating unit in an embodiment of the thermal recording head according to the present invention. Numeral 1 designates a base plate, numeral 2 a partial glaze layer which has a semicylindrical section being about 1 mm wide and about 50 μm high and which is formed on the base plate 1, and numeral 3 heating elements which are formed substantially at the apex of the partial glaze layer 2. Numeral 57 indicates dot separating slits, while numeral 58 indicates intermediate slits each of which is provided centrally of one dot, and the width $W_1$ of the dot separating slit and that $W_2$ of the intermediate slit are set to be equal. Numeral 59 indicates a common electrode, and numeral 60 individual electrodes. The common electrode 59 is extended from the end surface 1*a* of the base plate 1 to the rear surface thereof, and is electrically connected to the common input lead 17 shown in FIG. 1. The individual electrodes 60 are connected to the IC for driving the heating elements, not shown (7 in FIG. 2). In this regard, since the patterns of the individual electrodes leading to the IC have a periodicity every number of bits of the IC, the resistances of the individual electrodes are rendered substantially constant for all the dots by adjusting the widths and lengths of the respective patterns. The contact pressure between the heating elements 3 and the recording sheet can be heightened by forming the heating elements 3 on the partial glaze layer 2, and the density of the heating elements can be equivalently doubled by providing the intermediate slits 58 under the slit width condition of $W_1=W_2$ Besides, since the common electrode is extended to the rear surface of the base plate, the resistance thereof can be rendered substantially zero, so that even when a large number of dots are simultaneously energized, a voltage drop hardly arises in the common electrode. The radiating plate shown in FIGS. 1 and 2 is mounted on the base plate 1 formed with such heating elements, whereby a picture print of high picture quality free from any density irregularity or roughness can be obtained.

Figure 11:
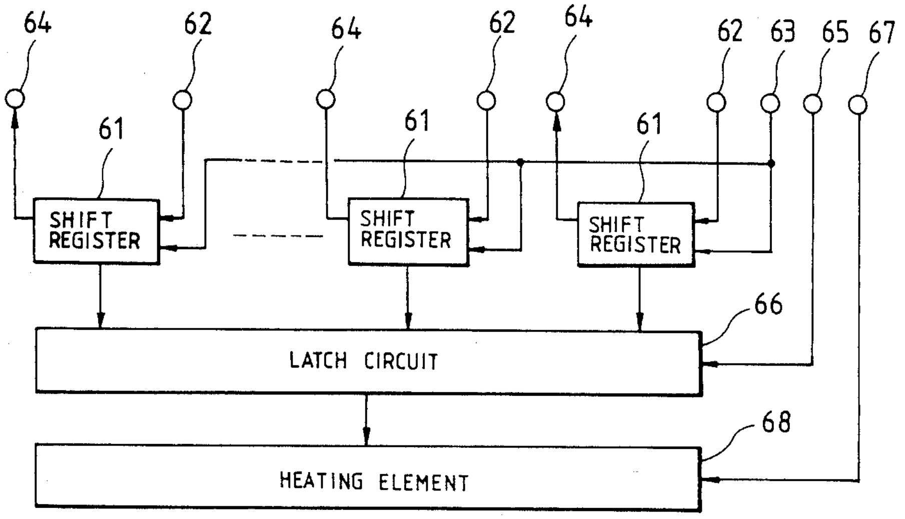
FIG. 11 is a diagram of a driver circuit in the head of the present invention.

FIG. 11 shows an example of a driver circuit for the heating elements of the thermal recording head according to the present invention.

Referring to the figure, numerals 61 designate shift registers corresponding to 256 bits, for example, four connected shift registers each being of 64 bits, numerals 62 data input terminals, numeral 63 a clock pulse input terminal, and numerals 64 data output terminals. According to this embodiment, items of picture data can be divided into a plurality of groups and be simultaneously input to the plurality of shift registers 61. Therefore, the period of time for data transfer can be greatly shortened, and even the picture data of a large picture having a large number of data items can be input in a short time. When all the data items are input to the shift registers 61, a latch pulse is input through a latch pulse input terminal 65, and the data items having been stored in the plurality of shift registers 61 are sent to a latch circuit 66, whereupon next data can be input to the shift registers 61. Numeral 67 indicates a strobe signal input terminal. When a strobe pulse is input through this input terminal, the heating elements 68 are brought into energized or deenergized states in accordance with the data items having been stored in the latch circuit 66, whereby printing for one line is carried out. According to this embodiment, the period of time for inputting data and the period of time for printing can be shortened, so that high-speed printing is permitted. Besides, in a case where one line is dividedly printed by several times of operations, white stripes are not apprehended to appear at the boundary parts of the heating elements. By the way, the shift registers 61 and the latch circuit 66 shown in FIG. 11 are implemented as ICs in, for example 64-dot unit, and the ICs are installed on the base plate 1 as indicated at numeral 7 in FIG. 2. The input/output terminals 62, 63, 64, 65 and 67 are wired on the flexible base plate indicated at numeral 9 in FIG. 2, and are connected to the connectors 13.

Figure 12:
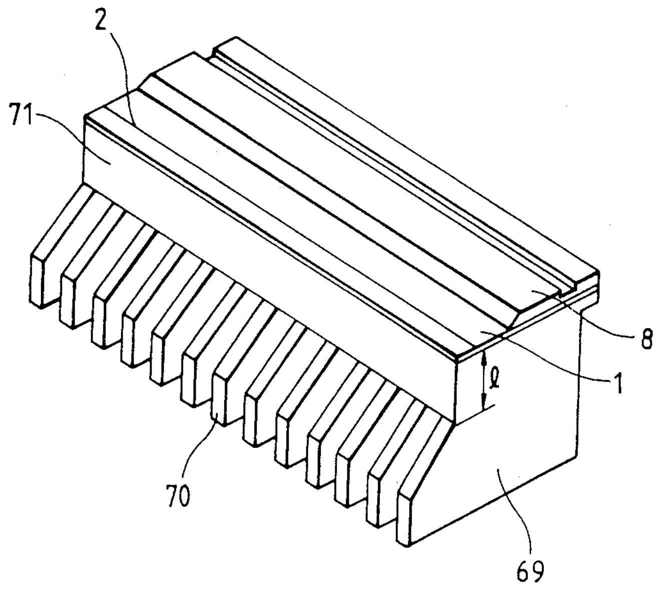
FIG. 12 is a perspective view showing another embodiment of the head of the present invention.

FIG. 12 is a perspective view showing another embodiment of the thermal recording head according to the present invention, and the same symbols are assigned to the same portions as in the foregoing embodiments. Referring to the figure, numeral 69 designates a radiating plate which is fixed to the rear surface of a base plate 1 and which is made integral with radiating fins 70. By making the radiating plate integral with the radiating fins, thermal resistances at the contact planes between the radiating plate and the radiating fins can be removed, and the radiating property of the head can be improved more, so that the variation of a head temperature and the variation of a recording density in a continuous printing operation for a long time can be further mitigated. Also in this embodiment, the thickness 1 of the block portion 71 of the radiating plate 69, the specifications of mounting holes, etc. are, of course, set so as to fulfill the relational expressions mentioned before.

Since, according to the present invention, the thickness and mass of a radiating plate increase, the effect of heat radiation heightens, and a thermal time constant enlarges, so that a density variation in a print can be sharply diminished. In addition, the spacing between a base plate and the bottom of each of mounting holes to be formed in the rear surface of the radiating plate can be made sufficiently great, and even when the mounting holes are formed at positions substantially corresponding to a heating element array, the worsening of a radiating property attributed to the mounting holes is negligible, so that the appearance of a density irregularity can be prevented, and the accuracy of the contact between heating elements and a platen roller can be heightened. For these reasons, especially in a picture print of large area, a high printed picture quality of smoothness and good color reproducibility can be attained. Further, also the side surface of the radiating plate can be provided with various mounting holes, so that a temperature control of high accuracy and the miniaturization of a printer mechanism system are permitted.

What is claimed is:

1. In a thermal recording head having a base plate, heating elements which are disposed in one array on a front surface of the base plate, a radiating plate which is fixed to a rear surface of the base plate, and mounting holes which are formed so as to extend toward the base plate from a rear surface side of the radiating plate opposite to a base plate side thereof; a thermal recording head characterized in that, letting d denote the largest one of the diameters of said mounting holes, a thickness 1 of said radiating plate satisfies $1 \geqq 2d$, that some of said mounting holes are disposed at predetermined intervals at positions substantially corresponding to the heating element array, and that a spacing $1_2$ between said base plate and a bottom of each of said mounting holes satisfies $1_2 \geqq d$.

2. A thermal recording head as defined in claim 1, wherein said mounting holes are holes for regulating positions of the head heating elements relative to a platen roller.

3. A thermal recording head as defined in claim 1, wherein said mounting holes are holes for mounting compressing springs which impart a head contact pressure.

4. A thermal recording head as defined in claim 1, wherein both surface of said radiating plate is formed with a hole for mounting a roller which serves to convey either of an ink sheet and a recording sheet.

5. A thermal recording head as defined in claim 1, wherein a side surface of said radiating plate is formed with a hole for mounting a temperature detecting thermistor.

6. A thermal recording head as defined in claim 1, wherein said radiating plate is integrally formed with radiating fins.

* * * * *